Feb. 23, 1937.　　　B. H. KENNEDY　　　2,071,842
FAUCET CONNECTION
Filed Aug. 22, 1936

INVENTOR.
BENJAMIN H. KENNEDY
BY
Clark + Ott
ATTORNEYS

Patented Feb. 23, 1937

2,071,842

UNITED STATES PATENT OFFICE 2,071,842

FAUCET CONNECTION

Benjamin H. Kennedy, Rochester, N. Y.

Application August 22, 1936, Serial No. 97,362

4 Claims. (Cl. 285—90)

This invention relates to devices for detachably connecting a hose or other conduit with a faucet and has particular reference to an improved connection of this character which is so constructed and arranged as to insure a proper frictional gripping and retention of the same on the faucet.

The invention comprehends a faucet connection which includes a flexible elastic hollow body having a reduced expansible portion providing a restricted faucet engaging throat and which portion is provided with means functioning to resiliently retain the said portion in normally contracted condition and for tensioning the throat so as to exert an inward contraction about the outlet end of the faucet.

The invention further provides a faucet connection which includes a flexible elastic hollow body having a reduced expansible medial portion defining a throat adapted to be expanded over the end of the faucet so as to grippingly engage the same, and which portion is provided with outwardly extending thickened wall areas functioning to resiliently maintain the said portion in normally contracted condition and for tensioning the throat in order to effect an inward contraction of the same about the end of the faucet.

The invention further contemplates a faucet connection which includes a flexible elastic hollow body having enlarged opposite end portions and a reduced medial portion providing a restricted expansible throat adapted to engage over the end of the faucet, and which medial portion is provided with longitudinally extending, outwardly projecting radially disposed ribs functioning to resiliently maintain the said portion in normally contracted condition and for tensioning the throat so as to exert an inward contraction thereof about the end of the faucet.

The invention further includes in a faucet connection of the character described, a reduced expansible portion having a restricted throat adapted to engage about the end of the faucet and an inner end portion merging with the faucet engaging portion and which inner end portion is expansible under pressure of the water flowing therethrough so as to provide an enlarged water passage adjacent the inner end of the faucet engaging portion.

The invention more specifically provides a faucet connection comprising a flexible elastic hollow member having an enlarged outer end portion defining a mouth, a reduced medial portion providing a restricted expansible throat adapted to engage over the end of the faucet and which portion is provided with longitudinally extending outwardly projecting radial ribs functioning to inherently maintain the said portion in normally contracted condition about the end of the faucet and an inner end portion providing an enlarged water passage adjacent the inner end of the faucet engaging portion which expands under the water pressure to spread the inner end portions of the radial ribs and to augment the contractile gripping action of the medial portion of said member.

With the above enumerated and other objects in view, reference is made to the following specification and accompanying drawing in which there is set forth a preferred embodiment of the invention, while the appended claims cover variations and modifications thereof which fall within the scope of the invention.

Figure 1:
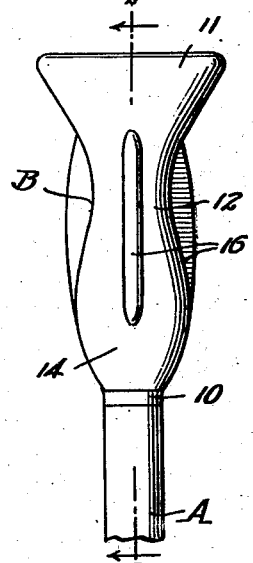
Fig. 1 is a side view of a faucet connection.
Figure 2:
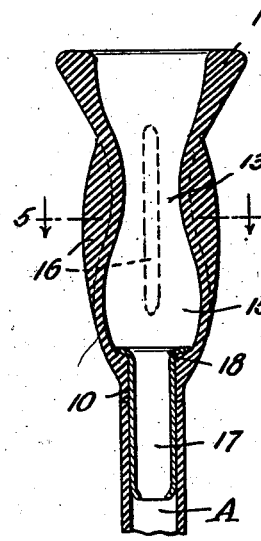
Fig. 2 is a vertical sectional view therethrough taken approximately on the line 2—2 of Fig. 1.
Figure 3:
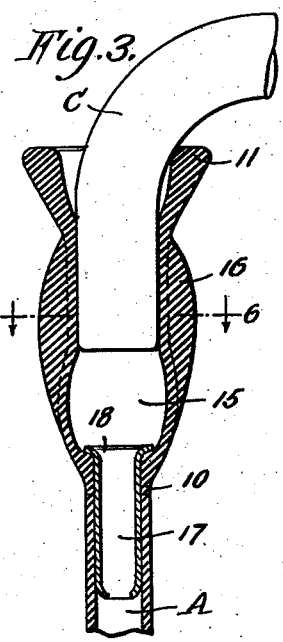
Fig. 3 is a similar view showing the same in applied position to a faucet.

Referring to the drawing by characters of reference, A designates generally a hose or other conduit and B the device for connecting the hose to a faucet C. The device B is constructed of a hollow flexible elastic body which is preferably vulcanized or otherwise secured to the terminal of the hose or conduit A at its lower or inner end 10 and is provided with an enlarged upper or outer end portion 11 which flares upwardly and outwardly to define an entrance mouth for facilitating the engagement of the device B over the outlet end of the faucet C. The device B is provided with a reduced medial portion 12 providing a restricted expansible throat 13 which is forced over the end of the faucet and is expanded to conform with the outer surface contour thereof.

Figure 4:
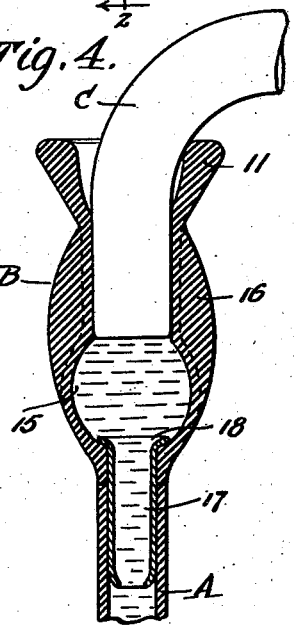
Fig. 4 is a similar view illustrating the expansion of the lower portion of the device under the pressure of the water.
Figure 5:
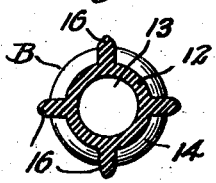
Fig. 5 is a horizontal sectional view taken approximately on the line 5—5 of Fig. 2.
Figure 6:
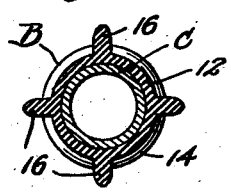
Fig. 6 is a horizontal sectional view taken approximately on the line 6—6 of Fig. 3.

An enlarged inner end portion 14 is provided which merges with the medial portion and provides an enlarged water passage 15 located between the terminal of the faucet outlet and the inner end 10. A plurality of longitudinally extending outwardly projecting radial ribs 16 are provided on the device B which extend from and partially overlie the enlarged outer and inner end portions 11 and 14 and provide thickened wall areas which function to resiliently maintain the device in applied position. The inner end portion 14 providing the enlarged water passage or chamber 15 is expansible by the pressure of the water flowing therethrough so as to spread the inner end portions of the ribs, as illustrated in Fig. 4, to thereby augment the contractile gripping action of the medial portion 12 and insure the retention of the device in applied position irrespective of the water pressure as it will be apparent that any increase in the water pressure will likewise increase the gripping action set up by the expansion in the water passage or chamber 15.

Preferably, an internal tubular bushing 17 having a flared upper end 18 is positioned within the device B and the hose or conduit A at their juncture so as to reenforce the structure in this region and confine the expansion to that portion of the device B located between the faucet terminal and the bushing.

What is claimed is:

1. In a faucet connection, a flexible elastic hollow body having a reduced expansible portion providing a restricted throat adapted to grippingly engage over the end of a faucet and which portion is provided with longitudinally extending, outwardly projecting radially disposed ribs functioning to resiliently maintain the said portion in normally contracted condition and for tensioning the throat for effecting an inward contraction of the same about the end of the faucet, and an enlarged inner end portion merging with the reduced expansible portion, said inner end portion being expansible under pressure of the water flowing therethrough which expansion fulcrums the ribs about the faucet end so as to exert a contractile gripping action of the faucet engaging portion with the faucet.

2. In a faucet connection, a flexible elastic hollow body having an expansible portion defining a reduced throat adapted to grippingly engage over the end of a faucet and an inner portion merging with the faucet engaging portion and which inner portion is expansible under pressure of the water flowing therethrough so as to create an enlarged water passage adjacent the inner end of the faucet engaging portion, and means adapted upon the expansion of the inner end portion to exert a contractile gripping action of the faucet engaging portion with the faucet.

3. In a faucet connection, a flexible elastic hollow body including an enlarged outer end portion defining a mouth, a reduced medial portion providing a restricted expansible throat adapted to engage over the end of the faucet, and an inner end portion merging with the medial portion, said reduced medial portion being provided with longitudinally extending outwardly projecting radial ribs having their opposite ends merging respectively with said inner and outer end portions and functioning to inherently maintain said medial portion in normally contracted condition, said inner end portion being expansible under pressure of the water flowing therethrough to provide an enlarged water passage adjacent the inner end of the faucet engaging portion and said inner end portion being provided with a restricted outlet forming a continuation of the enlarged water passage.

4. In a faucet connection, a flexible elastic hollow body including an enlarged outer end portion defining a mouth, an enlarged expansible inner end portion and a reduced medial portion merging with the said end portions, said medial portion being provided with longitudinally extending outwardly projecting radial ribs having their opposite ends merging respectively with said inner and outer enlarged end portions and functioning to inherently maintain the said medial portion in normally contracted condition and said inner end portion being expansible under pressure of the water flowing therethrough to spread the inner end portions of the ribs so as to augment the contractile gripping action of the said medial portion.

BENJAMIN H. KENNEDY.